(12) United States Patent
Ueda et al.

(10) Patent No.: US 9,111,391 B2
(45) Date of Patent: Aug. 18, 2015

(54) IMAGE GENERATING DEVICE, IMAGE GENERATING METHOD, AND NON-TRANSITORY INFORMATION STORAGE MEDIUM

(75) Inventors: Fumito Ueda, Tokyo (JP); Hitoshi Ishikawa, Tokyo (JP); Rui Guerreiro, Tokyo (JP); Atsuhiko Terada, Kanagawa (JP); Chihiro Kanno, Kanagawa (JP); Toshihiro Kamei, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 315 days.

(21) Appl. No.: 13/549,671

(22) Filed: Jul. 16, 2012

(65) Prior Publication Data

US 2013/0027414 A1   Jan. 31, 2013

(30) Foreign Application Priority Data

Jul. 26, 2011 (JP) .................................. 2011-163630

(51) Int. Cl.
*G06T 13/40* (2011.01)
*G06T 13/00* (2011.01)
*G06T 7/60* (2006.01)

(52) U.S. Cl.
CPC . *G06T 13/40* (2013.01); *G06T 7/60* (2013.01); *G06T 13/00* (2013.01)

(58) Field of Classification Search
USPC ................................. 345/522, 619
See application file for complete search history.

(56) References Cited

U.S. PATENT DOCUMENTS 6,302,354 B1 * 10/2001 Patera .......................... 244/3.15
2002/0171690 A1 * 11/2002 Fox et al. ........................ 345/862
2006/0262113 A1 * 11/2006 Leprevost ..................... 345/419

FOREIGN PATENT DOCUMENTS

JP         2001-6000          1/2001

OTHER PUBLICATIONS

Walter C. O'Dell, PhD, Christopher C. Moore, BSE, William C. Hunter, PhD, Elias A. Zerhouni, MD, and Elliot R. McVeigh, PhD, "Three-dimensional Myocardial Deformations: Calculation with Displacement Field Fitting to Tagged MR Images1", May 26, 2008, NIH Public Access, p. 3,6,15,19.*
Matthew Moore, "Collision Detection and Response for Computer Animation", 1988, Section 3.2.2.*
Wiki, Newton's law of universal gravitation, May 29, 2010.*
Japanese Office Action dated Jun. 4, 2013, from corresponding Japanese Application No. 2011-163630.

* cited by examiner

*Primary Examiner* — Mark Zimmerman
*Assistant Examiner* — Yu-Jang Tswei
(74) *Attorney, Agent, or Firm* — Katten Muchin Rosenman LLP

(57) ABSTRACT

An image generating device includes: a gravity parameter changing section for changing a parameter relating to gravity of each of a plurality of rigid bodies which are constrained to one another and included in a first object based on a positional relationship between each of the plurality of rigid bodies and a second object; a physical calculation section for physically calculating a motion of each of the plurality of rigid bodies included in the first object based on the changed parameter; and an image rendering section for rendering an image representing a surface of the first object based on the motions of the plurality of rigid bodies included in the first object.

11 Claims, 8 Drawing Sheets

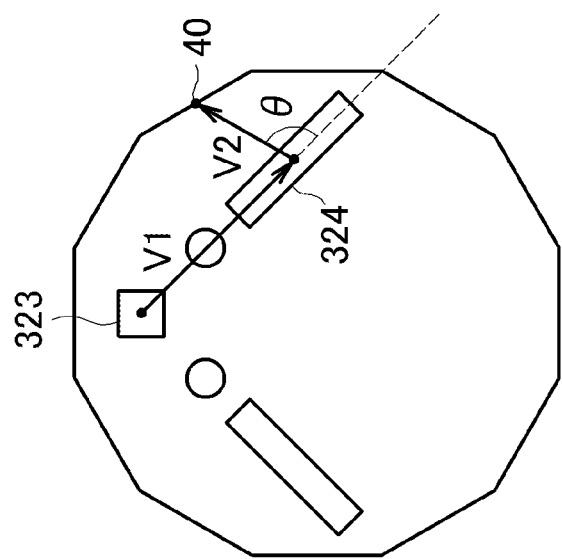
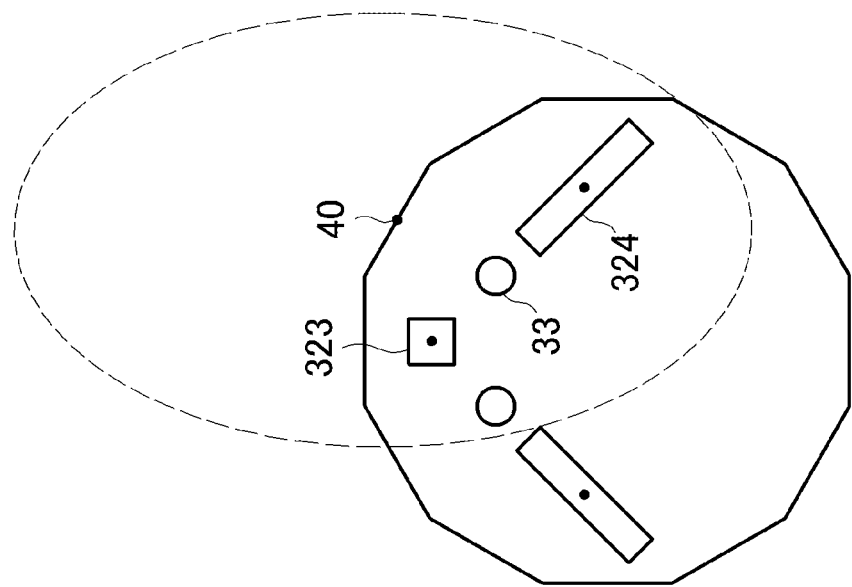

IMAGE GENERATING DEVICE, IMAGE GENERATING METHOD, AND NON-TRANSITORY INFORMATION STORAGE MEDIUM

CROSS-REFERENCE TO RELATED APPLICATION

The present application claims priority from Japanese application JP2011-163630 filed on Jul. 26, 2011, the content of which is hereby incorporated by reference into this application.

BACKGROUND OF THE INVENTION

1. Field of the Invention

The present invention relates to an image generating device, an image generating method, and an information storage medium.

2. Description of the Related Art

Recently, computer graphics combined with a physical simulation are actively used to generate images of three-dimensional objects in a virtual space. A calculation technology of delaying a timing of a movement of only a specific area of a surface of an object has been used in order to represent a sag of the surface of the object.

According to the related technology, in a case where a person clings to or rides on any one of the left and right sides of an animal, for example, it is difficult to express a sag caused by the clinging or the like.

SUMMARY OF THE INVENTION

The present invention has been made in view of the above-mentioned problem, and therefore has an object to provide a technology capable of generating, when a surface of a certain object is contacted by another object which rides thereon or clings thereto, an image expressing a natural sag of the former object.

In order to solve the above-mentioned problem, according to an exemplary embodiment of the present invention, there is provided a computer-readable non-transitory information storage medium having stored thereon a program for controlling a computer to execute the processing of: changing a parameter relating to gravity of each of a plurality of rigid bodies which are constrained to one another and included in a first object based on a positional relationship between each of the plurality of rigid bodies and a second object; physically calculating a motion of each of the plurality of rigid bodies included in the first object based on the changed parameter; and rendering an image representing a surface of the first object based on the motions of the plurality of rigid bodies included in the first object.

Further, according to an exemplary embodiment of the present invention, there is provided an image generating device, including: gravity parameter changing means for changing a parameter relating to gravity of each of a plurality of rigid bodies which are constrained to one another and included in a first object based on a positional relationship between each of the plurality of rigid bodies and a second object; physical calculation means for physically calculating a motion of each of the plurality of rigid bodies included in the first object based on the changed parameter; and image rendering means for rendering an image representing a surface of the first object based on the motions of the plurality of rigid bodies included in the first object.

Further, according to an exemplary embodiment of the present invention, there is provided an image generating method, including: changing a parameter relating to gravity of each of a plurality of rigid bodies which are constrained to one another and included in a first object based on a positional relationship between each of the plurality of rigid bodies and a second object; physically calculating a motion of each of the plurality of rigid bodies included in the first object based on the changed parameter; and rendering an image representing a surface of the first object based on the motions of the plurality of rigid bodies included in the first object.

According to the present invention, when a surface of a certain object is contacted by another object which rides thereon or clings thereto, an image expressing a natural sag of the former object can be generated.

In the exemplary embodiment of the present invention, the processing of changing the parameter relating to gravity may include selecting at least one rigid body out of the plurality of rigid bodies which are constrained to one another and included in the first object based on the positional relationship between each of the plurality of rigid bodies and the second object, and changing the parameters relating to gravity of the selected rigid body.

In the exemplary embodiment of the present invention, the processing of changing the parameter relating to gravity may include selecting at least one rigid body out of the plurality of rigid bodies included in the first object based on proximity between each of the plurality of rigid bodies included in the first object and a contact position at which the second object is in contact with a mesh representing a surface of the first object.

In the exemplary embodiment of the present invention, the processing of changing the parameter relating to the gravity may include changing the parameter so that a value of the parameter relating to gravity of the selected rigid body changes based on the positional relationship between the rigid body and the second object.

In the exemplary embodiment of the present invention, the processing of changing the parameter relating to the gravity may include changing the parameter so that a value of the parameter relating to gravity of the selected rigid body changes based on proximity between the selected object and a contact position between the first object and the second object.

In the exemplary embodiment of the present invention, the processing of changing the parameter relating to gravity may include selecting at least one of the plurality of the rigid bodies included in a range which is represented by a prolate spheroid wherein a center thereof is the contact position and which stretches in a predetermined direction.

In the exemplary embodiment of the present invention, the processing of changing the parameter relating to gravity may include selecting at least one rigid body so that an angle formed by a vector from a position of the selected rigid body to the contact position and a vector from a position of a rigid body connected to the selected rigid body to the position of the selected rigid body satisfies a predetermined condition.

In the exemplary embodiment of the present invention, the processing of changing the parameter relating to gravity may include changing a change amount of the parameter based on whether or not the value of the parameter increases from mass in a previous frame.

In the exemplary embodiment of the present invention, the processing of physically calculating the motion of the rigid body may include calculating a motion of the second object based on a positional relationship between the mesh and the second object.

BRIEF DESCRIPTION OF THE DRAWINGS

In the accompanying drawings:

FIG. 8 is a diagram illustrating an example of an influence range about a contact point;

FIG. 9 is a diagram illustrating an example of an angle for determining whether or not a rag doll is subject to a mass change;

DETAILED DESCRIPTION OF THE INVENTION

Figure 1:
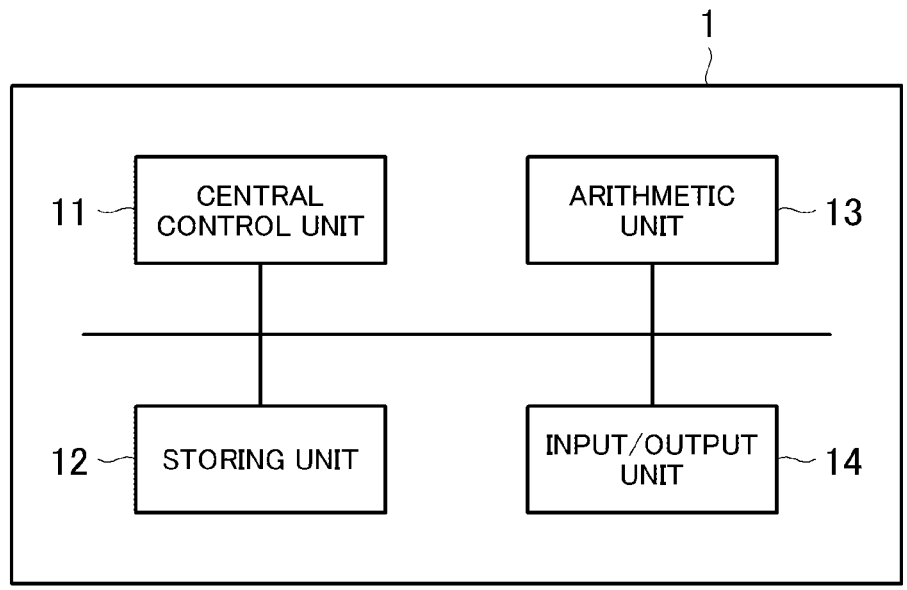
FIG. 1 is a diagram illustrating a configuration of an image generating device according to an embodiment of the present invention.

Hereinafter, an embodiment of the present invention is described with reference to the accompanying drawings. FIG. 1 is a diagram illustrating a configuration of an image generating device 1 according to the embodiment of the present invention. The image generating device 1 includes a central control unit 11, a storing unit 12, an arithmetic unit 13, and an input/output unit 14. The image generating device 1 is a device having a function of generating a three-dimensional image, as exemplified by a personal computer or a consumer game machine.

The central control unit 11 operates in accordance with a program stored in the storing unit 12 and controls the arithmetic unit 13 and the input/output unit 14. Note that, the above-mentioned program may be provided by being stored in a computer-readable information storage medium such as a DVD-ROM, or may be provided via a network such as the Internet.

The storing unit 12 includes a memory element such as a RAM or a ROM, a hard disk drive, and the like. The storing unit 12 stores the above-mentioned program. The storing unit 12 also stores information input from the respective units and operation results.

The arithmetic unit 13 has a function of performing arithmetic operation such as floating-point calculation at high speed. The arithmetic unit 13 operates in accordance with the program stored in the storing unit 12 and outputs the calculation result to the storing unit 12 and the input/output unit 14.

The input/output unit 14 includes means for controlling a display output device such as a monitor, means for controlling an input device such as a mouse, and the like. The input/output unit 14 outputs image data and the like to the display output device and acquires information from an operator through the input device under control of the central control unit 11.

Figure 2:
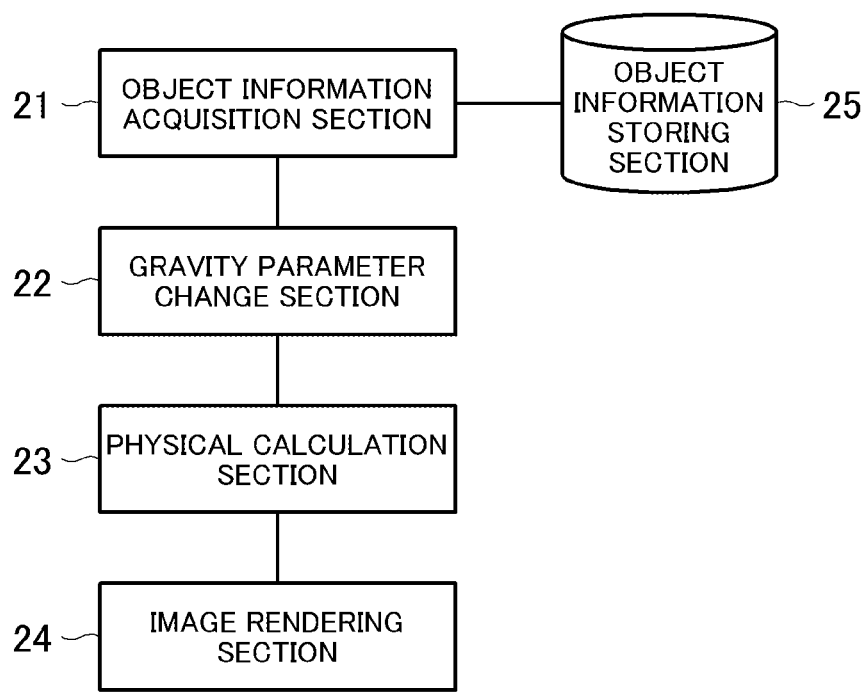
FIG. 2 is a functional block diagram illustrating the image generating device according to the embodiment of the present invention.

FIG. 2 is a functional block diagram of the image generating device 1 according to the embodiment of the present invention. The image generating device 1 functionally includes an object information acquisition section 21, a gravity parameter change section 22, a physical calculation section 23, an image rendering section 24, and an object information storing section 25. Those functions are implemented by the central control unit 11 and the arithmetic unit 13 executing the program stored in the storing unit 12 and controlling the input/output unit 14.

Figure 3:
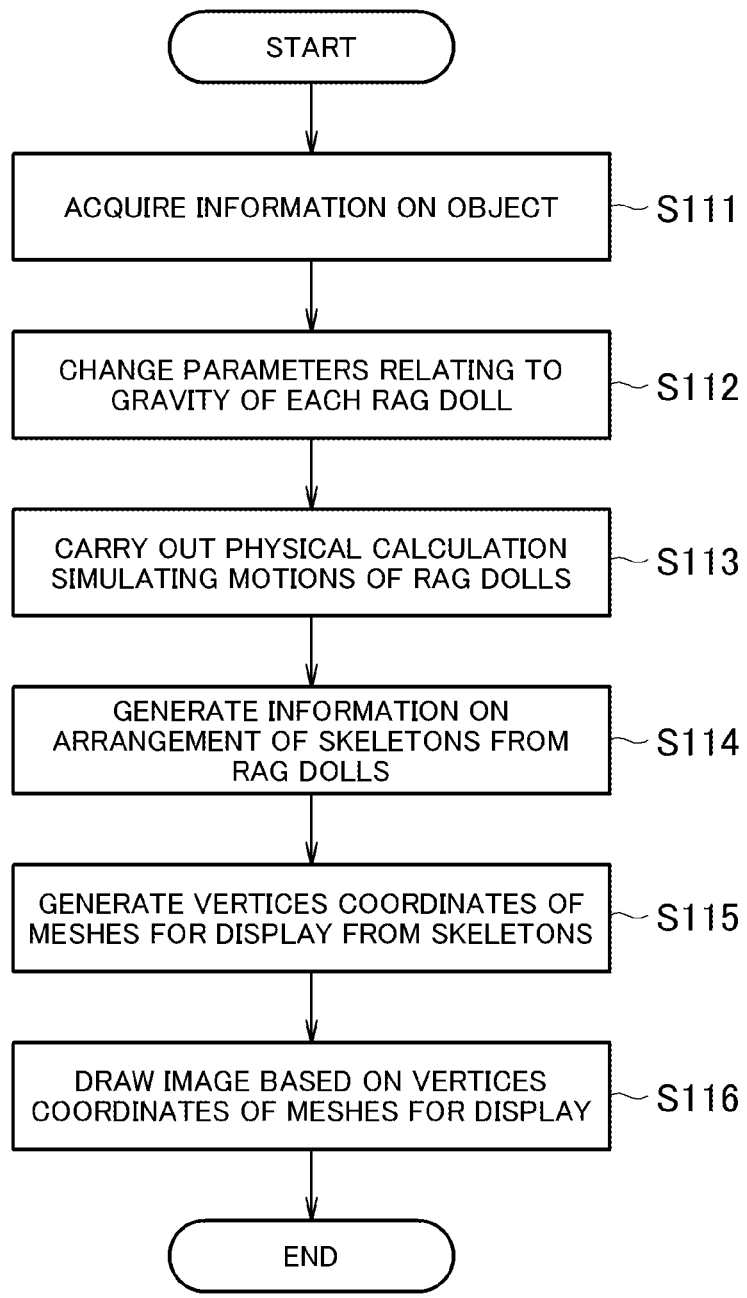
FIG. 3 is a flowchart illustrating an example of a process flow of the image generating device.

Hereinafter, processes of the functions of the image generating device 1 are described in order of the processes. FIG. 3 is a flowchart illustrating an example of a process flow of the image generating device 1 according to the embodiment of the present invention.

The object information acquisition section 21 is implemented mainly by the central control unit 11 and the arithmetic unit 13. An object information acquisition section 21 acquires information on an object an image of which is to be rendered from the object information storing section 25 (Step S111). On this occasion, the object information storing section 25 is implemented mainly by the storing unit 12, and stores information on objects.

Figure 4:
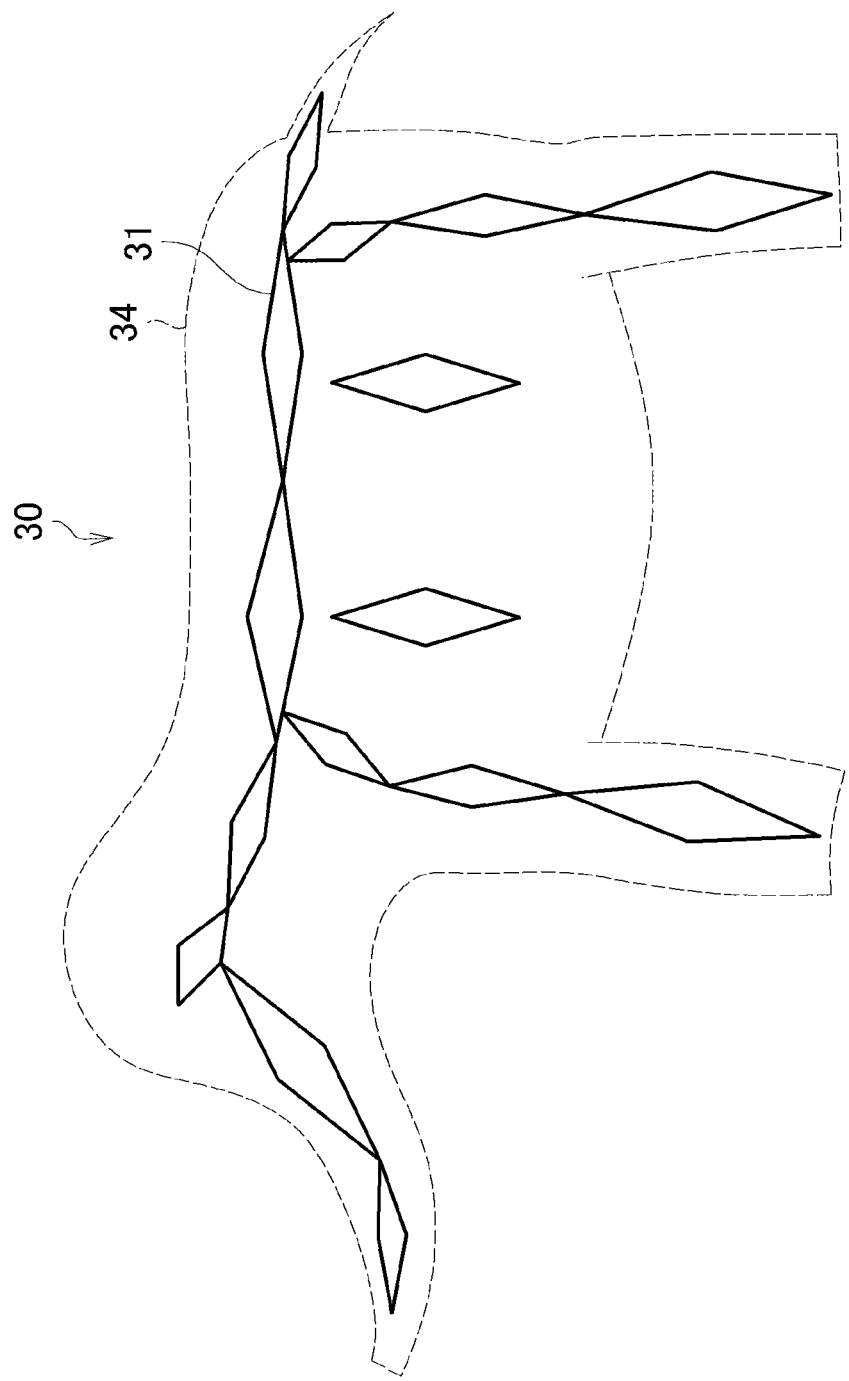
FIG. 4 is a diagram illustrating an example of an object to be rendered.
Figure 5:
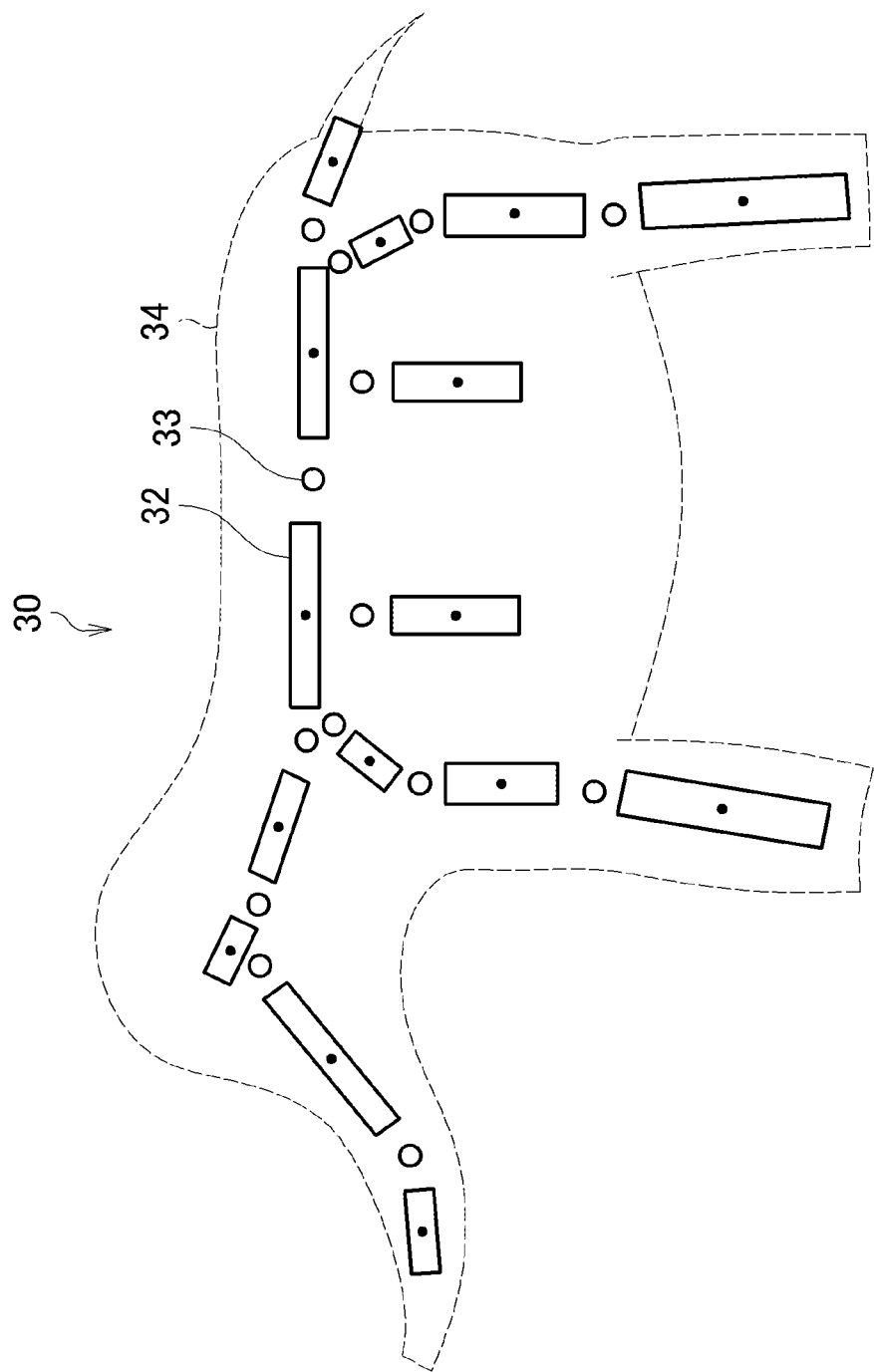
FIG. 5 is a diagram illustrating an example of rag dolls included in the object illustrated in FIG. 4.

The object contains a plurality of skeletons 31, a plurality of rag dolls 32, a plurality of joints 33, and a plurality of meshes 34, and information on the object includes these pieces of information. FIG. 4 is a diagram illustrating an example of an object of interest 30 to be rendered, and FIG. 5 is a diagram illustrating an example of rag dolls 32 included in the object of interest 30 illustrated in FIG. 4.

Each skeleton 31 serves as a portion forming a framework of the object, and is used to render the object. Each skeleton 31 includes a center position, an angle, and a length as its information. The rag doll 32 is a rigid body subject to a physical simulation. Each of the rag dolls 32 corresponds to any one of the skeleton 31 on a one-to-one basis. Each of the rag dolls 32 includes a center position, an angle, a velocity, an angular velocity, reference mass, which is mass serving as a reference, a moment of inertia, and the like, as its information, and the center position of the rag doll 32 and the center position of the corresponding skeleton 31 are approximately the same positions in the same coordinate system. The rag doll 32 is connected with other rag doll 32 via joints 33, and rag dolls 32 connected with each other are mutually constrained. The joint 33 exists corresponding to a connection between two rag dolls 32, and represents a constraint condition between those two rag dolls 32. The physical calculation section 23 described later calculates a motion (such as velocity, angular velocity, position, and angle) of each rag doll 32 based on the constraint conditions between this rag doll 32 and other rag dolls 32, external forces, and the like. Then, the calculated position and angle of the rag doll 32 are reflected to the position and the angle of a corresponding skeleton 31. A plurality of meshes 34 constitute a surface of an object. The shape of the mesh 34 is a polygon, and information thereon is information representing vertices of the polygon. Note that, an example of the object of interest 30 illustrated in FIGS. 4 and 5 is a large animal having four legs. Note that, all the rag dolls 32 are not necessarily connected to other rag dolls 32. For example, the number of rag dolls 32 constituting a certain object may be one, and this rag doll 32 may be a single rag doll which is not connected to other rag dolls 32.

Figure 6:
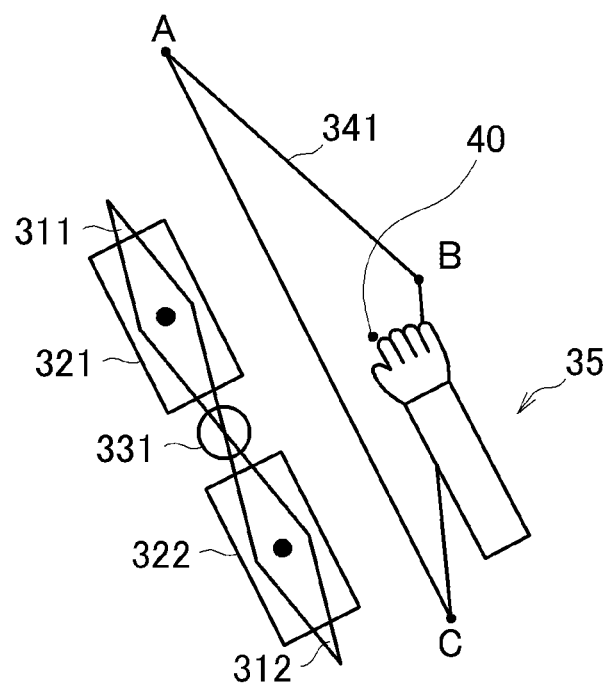
FIG. 6 is a diagram illustrating an example of a relationship among skeletons, rag dolls, and a mesh.

A position and a shape of each mesh 34 are determined based on positions of skeletons 31 calculated based on movement of rag dolls 32, and the like. FIG. 6 is a diagram illustrating an example of a relationship among skeletons 31, rag dolls 32, and a mesh 34. In the example of FIG. 6, a rag doll 321 and a rag doll 322 are connected with each other via a joint 331, and the center position and the angle of the rag doll 321 and a skeleton 311 coincide with each other, and the center position and the angle of the rag doll 322 and a skeleton 312 coincide with each other. On this occasion, coordinates of vertices A to C of a mesh 341 are determined in accordance with the center positions and the angles of the skeletons 311 and 312. In the example of this diagram, the coordinates of the vertex A are determined as a function of the position and the angle of the skeleton 311, the coordinates of the vertex C are determined as a function of the position and the angle of the skeleton 312, and the coordinates of the vertex B are determined as a function of the positions and the angles of the skeletons 311 and 312. The mesh 341 is a polygon enclosed by edges connecting the three vertices with each other, and the surface of the object of interest 30 is constituted by a plurality of meshes 34 including the mesh 341. Note that, a contact point 40 at which the object of interest 30 and another object 35 come in contact with each other when the another object 35 clings or collides to the object of interest 30 exists on any one of the meshes 34. The another object is an object different from the object of interest 30. An action is applied from the object of interest 30 to the another object 35 via this contact point 40.

The gravity parameter change section 22 is implemented mainly by the central control unit 11, the storing unit 12 and the arithmetic unit 13. The gravity parameter change section 22 changes parameters relating to gravity of each rag doll 32 based on a positional relationship with the another object 35 (Step S112). The parameters relating to gravity are parameters determining the gravity applied to each rag doll 32, and specifically are the mass and the gravitational acceleration. The gravity parameter change section 22 changes at least any one of the mass of each rag doll 32 and the gravitational acceleration applied to this rag doll 32. When the gravity parameters are changed, the gravity applied to the rag doll 32 changes, and the position of the rag doll 32 changes. This phenomenon is used to express a sag. A specific description is now given of an example of changing the mass.

Figure 7:
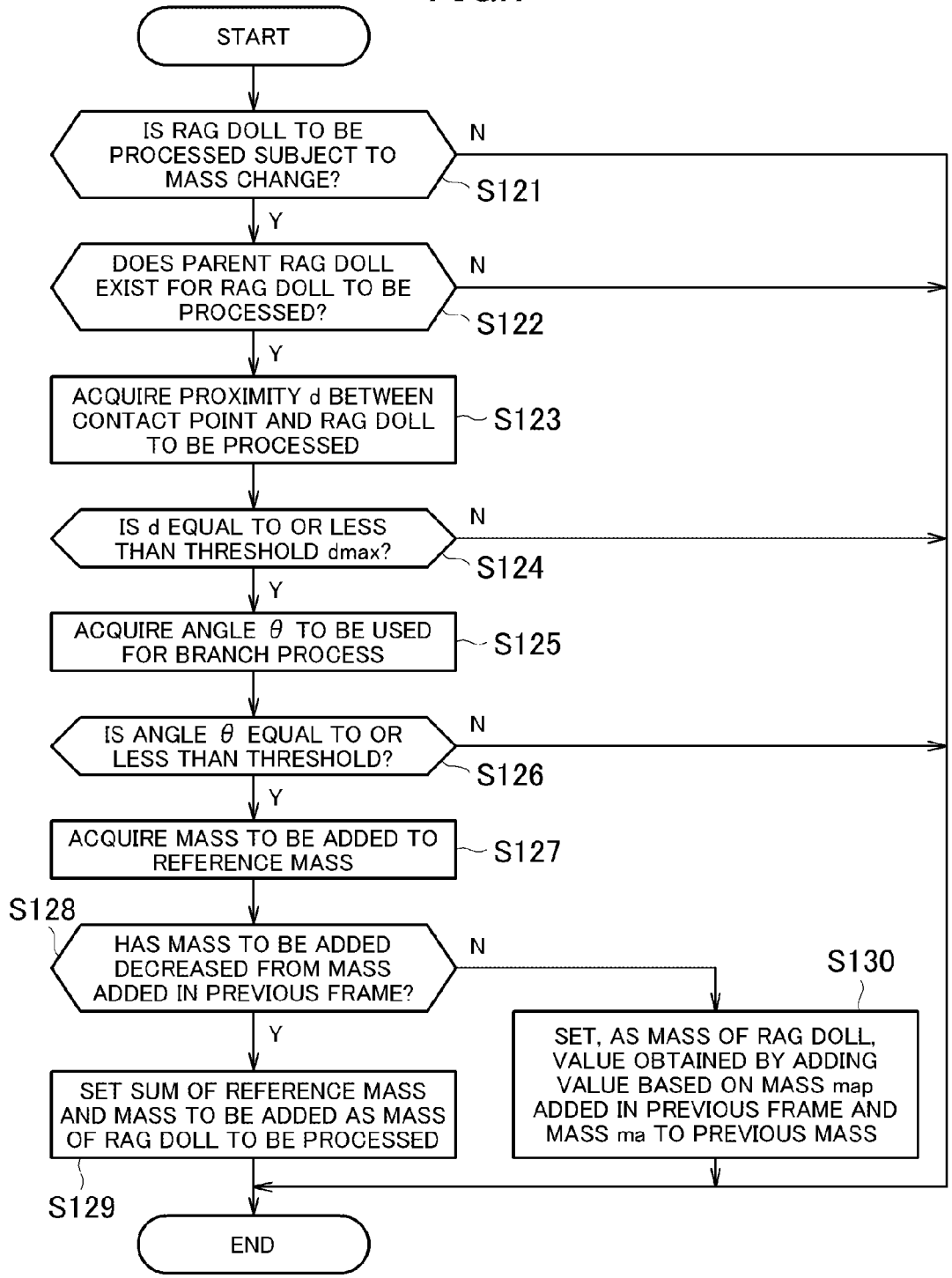
FIG. 7 is a flowchart illustrating an example of a process flow of a gravity parameter change section.

FIG. 7 is a flowchart illustrating an example of a process flow of the gravity parameter change section 22. The gravity parameter change section 22 carries out the processing illustrated in FIG. 7 for each of rag dolls 32 included in the object of interest 30. First, the gravity parameter change section 22 determines whether or not a rag doll 32 to be processed out of the rag dolls included in the object of interest 30 is subject to the mass change (Step S121). A value of a mass change subject flag representing whether or not a rag doll 32 is subject to the mass change is determined before the processing, and is stored as a piece of information of the rag doll 32 of the object information storing section 25. The gravity parameter change section 22 determines whether or not the rag doll 32 is subject to the mass change based on the value of the mass change subject flag of the rag doll 32 acquired by the object information acquisition section 21. When the value of the mass change subject flag indicates that the rag doll 32 is not subject to the mass change (N in Step S121), the gravity parameter change section 22 finishes the processing for the rag doll 32. When the gravity parameter change section 22 finishes the processing for the rag doll 32, and there is a next rag doll 32, the gravity parameter change section 22 sets the next rag doll 32 as the rag doll 32 to be processed, and carries out the processing starting from Step S121.

When the value of the mass change subject flag indicates that the rag doll 32 is subject to the mass change (Y in Step S121), the gravity parameter change section 22 determines whether or not a parent rag doll exists for the rag doll 32 to be processed (Step S122). On this occasion, there is a parent-child relationship between two rag dolls 32 connected with each other, and a rag doll 32 which is a parent is referred to as parent rag doll, whereas a rag doll 32 which is a child is referred to as child rag doll. A state in which a parent rag doll does not exist for a rag doll 32 is equivalent to a state in which all connected rag dolls 32 are child rag dolls. A rag doll 32 which does not have a parent rag doll is a rag doll 32 serving as a start point, and there is one such a rag doll for each object. In the example of FIG. 5, a rag doll 32 serving as a start point may be a rag doll 32 corresponding to a portion on a spine close to a neck. Information on which rag doll is a parent rag doll for each rag doll 32 is stored in the object information storing section 25, and the gravity parameter change section 22 determines whether or not a parent rag doll exists for the rag doll 32 based on the information on a parent rag doll acquired by the object information acquisition section 21. When a parent rag doll does not exist for the rag doll 32 to be processed (N in Step S122), the processing for this rag doll 32 is finished.

When there is a parent rag doll for the rag doll 32 to be processed (Y in Step S122), the gravity parameter change section 22 acquires a value d of a proximity between the contact point 40 and the rag doll 32 to be processed (Step S123). When xyz coordinates of the contact point 40 are expressed as (px,py,pz), and center coordinates of the rag doll 32 to be processed are expressed as (rx,ry,rz), the value of proximity d is acquired according to the following equation:

$$d=(px-rx)^2+k(py-ry)^2+(pz-rz)^2.$$

On this occasion, k is a value smaller than 1, and the y direction is equivalent to a direction in which the gravity is applied. The gravity parameter change section 22 calculates the value d of the proximity based on the coordinates of the contact point 40 and the center coordinates of the rag doll 32 to be processed. Then, the gravity parameter change section 22 determines whether or not the proximity d is equal to or less than a threshold Dmax (Step S124). When the proximity d is more than the threshold Dmax (N in Step S124), the gravity parameter change section 22 finishes the processing for this rag doll 32, and when the proximity is equal to or less than the threshold Dmax (Y in Step S124), the gravity parameter change section 22 carries out processing starting from Step S125.

The above-mentioned processing excludes rag dolls 32 out of the predetermined range about the contact point 40 from the subject of the processing of the mass change. This predetermined range is referred to as an influence range hereinafter. FIG. 8 is a diagram illustrating an example of the influence range about a contact point. The influence range is a prolate spheroid and stretches in the y direction. The center of the prolate spheroid is the contact position. An axis of the prolate spheroid stretches in the y direction. The gravity parameter change section 22 changes the mass of rag dolls 32 satisfying other conditions out of rag dolls 32 (rag dolls 323 and 324 in the example of FIG. 8) within the influence range represented by the spheroid. The fact that the influence range stretches in the y direction is to express that an actual sagging range becomes large in the vertical direction when an object is actually grasped. This configuration enables to naturally reflect a sag caused by an action such as clinging and riding.

In Step S125, the gravity parameter change section 22 acquires an angle θ for determining whether or not the rag doll 32 is subject to the mass change. FIG. 9 is a diagram illustrating an example of the angle θ for determining whether or not the rag doll 32 is subject to the mass change. The angle θ is an angle between a vector V1 from a center position of a parent rag doll of the rag doll 32 to be processed to the center position of the rag doll 32 to be processed, and a vector V2 from the center position of the rag doll 32 to be processed to the contact point 40. Then, when the acquired angle θ is larger than a threshold θmax (N in Step S126), the gravity parameter change section 22 finishes the processing of changing the parameters relating to gravity of the rag doll 32. When the acquired angle is equal to or less than the threshold θmax (Y in Step S126), the gravity parameter change section 22 acquires mass to be added to the rag doll 32 in steps starting from Step S127. On this occasion, the threshold θmax is set to each of the rag dolls 32. On this occasion, as can be seen from FIG. 9, as the angle θ increases from 90 degrees, a possibility that the contact point 40 is farther than the parent rag doll increases, and when the angle θ exceeds a certain angle, the contact point 40 is behind the parent rag doll with respect to the rag doll 32 to be processed in consideration of the condition of proximity. In other words, by using the angle θ, it is possible to easily determine whether or not the contact point 40 is behind the parent rag doll. In this way, in a case where a parent rag doll is not a subject to the mass change and two rag dolls 32 constituting child rag dolls 32 are connected on both left and right sides thereof, when a contact point 40 is on the left side of the parent rag doll, it is possible to prevent a phenomenon that a sag is unexpectedly generated on the right side. Note that, a rag doll 32 expressing a sag may be a rag doll only connected to a parent rag doll 32 corresponding to a framework. In this case, the angle θ may be acquired by using a rag doll 32, which is not a parent rag doll, but a rag doll 32 simply connected to a rag doll 32 to be processed.

The processing of Steps S121 to S126 is processing of selecting rag dolls 32 subject to the change in parameters relating to gravity such as the mass out of the rag dolls 32 included in the object of interest 30 based on the positional relationship between each of the rag doll 32 and the another object 35. When the transition to next processing is possible, the rag dolls 32 to be processed are selected to be subject to the mass change. The conditions for selecting the rag doll 32 are: the rag doll 32 is set as a subject for the mass change in advance; the rag doll 32 has a parent rag doll; the rag doll 32 is within the influence range represented by a predetermined spheroid about the contact point 40 stretched in the gravity direction; and the angle formed by the vector V1 from the center position of a parent rag doll to the center position of the rag doll 32 to be processed and the vector V2 from the center position of the rag doll 32 to be processed to the contact point 40 is equal to or less than the threshold.

Figure 10:
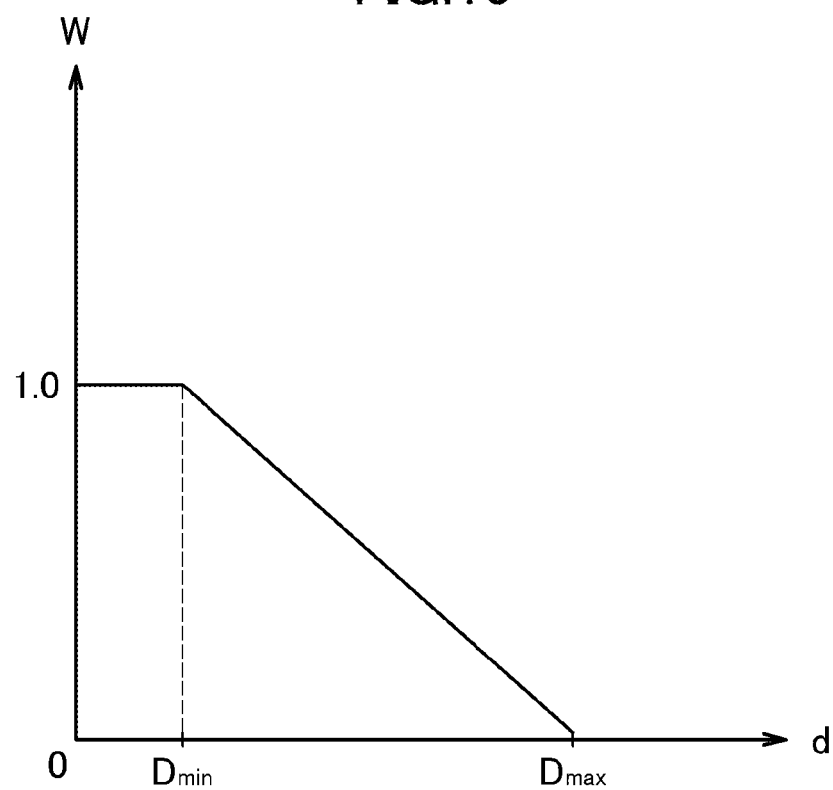
FIG. 10 is a graph illustrating an example of a relationship between a weight coefficient and a value of proximity.

Then, the gravity parameter change section 22 changes the value of the parameter relating to the gravity (mass here) of the selected rag doll 32 so that the value of the parameter relating to gravity changes based on a positional relationship between the rag doll 32 and the another object 35, more specifically the proximity between the contact point 40 and the rag doll 32. Frist, the gravity parameter change section 22 acquires mass ma to be added to reference mass of each of the rag dolls 32 (Step S127). The mass ma to be added is represented by the following equation.

$$ma = w \times mc$$

mc denotes mass of the another object 35 in contact via the contact point 40, and w denotes a weight coefficient. The mass ma to be added is acquired by multiplying the mass mc of the another object 35 in contact via the contact point 40 by the weight coefficient w based on the value d of the proximity. FIG. 10 is a graph illustrating an example of a relationship between the weight coefficient w and the value d of the proximity. Note that, Dmin is smaller than the threshold Dmax. In the example of FIG. 10, when the value d of proximity is smaller than Dmin, the weight coefficient w is 1, when the value d of proximity is between Dmin and Dmax, the weight coefficient linearly decreases as the value d of proximity increases, and when the value d of proximity reaches Dmax, the weight coefficient w becomes 0. In this way, the change amount of the mass of the rag doll 32 changes based on the proximity.

Then, the gravity parameter change section 22 changes the mass of the rag doll 32 to be processed based on the mass ma to be added. The gravity parameter change section 22 acquires a change amount so that a change amount from the mass of the rag doll 32 at a previous rendering (previous frame) is different between a case where the mass of the rag doll 32 increases and a case where the mass of the rag doll 32 decrease even for the same mass ma to be added. In other words, even if the proximity of the contact point 40 with respect to the rag doll 32 and the mass mc of the another object 35 are the same, the change amount is different between the case where the mass of the rag doll 32 increases from the mass in the previous frame and the case where the mass decreases therefrom. More specifically, the gravity parameter change section 22 compares the mass map added in the previous frame and the mass ma to be added at the current rendering (current frame) to the rag doll 32 to be processed (Step S128). When the mass ma to be added is increased from the mass map added in the previous frame (Y in Step S128), the mass of the rag doll 32 is set to a sum of the reference mass and the mass ma to be added (Step S129). When the mass ma to be added is decreased from the mass map added in the previous frame (N in Step S128), the mass of the rag doll 32 is set to a value obtained by multiplying a value obtained by subtracting the mass map added in the previous frame from the mass ma to be added by a coefficient less than one, and adding the product to the previous mass (Step S130).

$$m = mc + \text{map} + \alpha(ma - \text{map})$$

In this case, α is a positive number less than 1. With this configuration, when the mass decreases, the change in mass takes more time than the case where the mass increases. As a result, a period in which a sag returns to an original state can increase, resulting in a more natural expression. Note that, when the mass ma to be added increases from the mass map added in the previous frame, the mass to be added may be reflected over a plurality of frames. For example, the calculation equation for the mass m of the rag doll 32 may be set as the following equation.

$$m = mc + \text{map} + \beta(ma - \text{map})$$

where $0 < \alpha < \beta < 1$.

The mass of each of the rag dolls 32 to be used for the physical simulation can be obtained by carrying out the processing of Steps S121 to S130 for each of the rag dolls 32. Note that, the gravitational acceleration may be increased or decreased, or both the mass and the gravitational acceleration may be increased or decreased in place of increasing/decreasing the mass.

The physical calculation section 23 is implemented mainly by the central control unit 11, the storing unit 12, and the arithmetic unit 13. The physical calculation section 23 carries out the physical calculation for simulating the rag dolls 32 included in the object of interest 30 based on the parameters changed by the gravity parameter change section 22 (Step S113 illustrated in FIG. 3). The physical calculation section 23 calculates the motion (such as velocity and angular velocity) of the rag dolls 32 based on the physical constraint conditions imposed on each of the rag dolls 32 and other rag dolls connected to this rag doll 32. The physical calculation section 23 calculates the motion of each of the rag dolls 32 by using a calculation algorithm based on the equation of motion of each of the rag dolls 32. Moreover, the physical calculation section 23 calculates the motion of each of the rag dolls 32 reflecting gravity applied to each of the rag dolls 32. On this occasion, there are at least two constraint conditions on two rag dolls 32 connected with each other via a joint 33. One constraint condition is that a relative position of the joint 33 with respect to the parent rag doll does not change, and a relative position of the joint 33 with respect to the child rag doll does not change. The other constraint condition is that as the direction from the child rag doll to the joint 33 deviates from a direction set in advance, a force of directing the child rag doll to a direction opposite to the deviated direction increases. Note that, the direction set in advance is a direction determined relatively to the direction of the parent rag doll.

When the physical calculation is carried out under these constraint conditions, a motion of the rag doll 32 being displaced to a position where the gravity applied to the rag doll 32 and a force generated by the constraint conditions are balanced is generated. When the mass or the gravitational acceleration of the rag doll 32 are increased by clinging or the like, the gravity applied to the rag doll 32 increases, and the balanced position is displaced downward from a position in a case without any clinging.

Moreover, the physical calculation section 23 carries out physical calculation for a motion of the another object 35 based on a constraint condition between the contact point 40 and the another object 35. The constraint condition relates to a positional relationship between the contact point 40 and the another object 35 in the mesh 34, and, for the case of clinging, is that the coordinates of the contact point 40 and the coordinates of a tip of a rag doll 32 included in the another object 35 coincide with each other. As a result, a shape of the object of interest 30 deformed by the another object 35 is further reflected to the motion of the another object 35.

Figure 11:
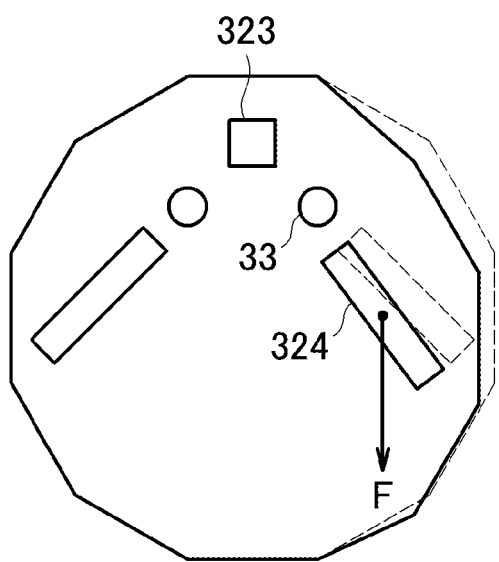
FIG. 11 is a diagram illustrating an example of a deformation of an object by a change in gravity.

FIG. 11 is a diagram illustrating an example of a deformation of an object by a change in gravity. Broken lines represent a state before a contact such as clinging. When the gravity F of the rag dolls 32 increases, the rag doll 324 is displaced downward, and the angle thereof directs further downward.

The image rendering section 24 is implemented mainly by the central control unit 11, the arithmetic unit 13, the storing unit 12, and the input/output unit 14. The image rendering section 24 renders three-dimensional images representing surfaces of the object of interest 30 and the another object 35 based on a motion of each of the rag dolls 32 physically calculated by the physical calculation section 23. The image rendering section 24 outputs the three-dimensional images to a display device such as a monitor via the input/output unit 14. The display device displays the generated three-dimensional images.

A description is now given of steps of generating information on a three-dimensional image of the physical object. First, the image rendering section 24 generates information on an arrangement of a skeleton 31 provided corresponding to each of the rag dolls 32 from the position and the angle of each of the rag dolls 32 (Step S114). Then, the image rendering section 24 generates vertex coordinates of meshes for display of which positional relationships with the coordinates of the skeletons 31 are determined in advance (Step S115). On this occasion, the mesh for display is a polygon constituting the surface of an object which is like the mesh 34 to be used by the gravity parameter change section 22, and the vertex coordinates thereof are determined based on the center position and the angle of the skeleton 31. Note that, the meshes for display are smaller in size and are larger in number compared with the meshes 34 to be used by the gravity parameter change section 22. This is because the meshes for display need to provide fine expressions. Then, the image rendering section 24 renders an image representing the surface of the object by using the generated vertex coordinates of the meshes for display (Step S116).

As a result of the above-mentioned processing, the sag of the shape in FIG. 11 changing from broken lines to solid lines can be expressed. Moreover, the parameters to be used for the physical calculation such as the mass and the gravitational acceleration to be used for the physical calculation are changed according to this embodiment, and it is thus possible to reflect influence of clinging to a motion of walking or running of the object of interest 30.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A computer-readable non-transitory information storage medium having stored thereon a program for controlling a computer to execute the processing of:
    changing a mass or a gravitational acceleration of each of a plurality of rigid bodies which are constrained to one another and included in a first object based on an angle between each of the plurality of rigid bodies and a second object;
    physically calculating a motion of each of the plurality of rigid bodies included in the first object based on the changed parameter; and
    rendering an image representing a surface of the first object based on the motions of the plurality of rigid bodies included in the first object.

2. The computer-readable non-transitory information storage medium having stored thereon a program according to claim 1, wherein the processing of changing the mass or the gravitational acceleration comprises selecting at least one rigid body out of the plurality of rigid bodies which are constrained to one another and included in the first object based on the angle between each of the plurality of rigid bodies and the second object, and changing the mass or the gravitational acceleration of the selected rigid body.

3. The computer-readable non-transitory information storage medium having stored thereon a program according to claim 2, wherein the processing of changing the mass or the gravitational acceleration comprises selecting at least one rigid body out of the plurality of rigid bodies included in the first object based on proximity between each of the plurality of rigid bodies included in the first object and a contact position at which the second object is in contact with a mesh representing a surface of the first object.

4. The computer-readable non-transitory information storage medium having stored thereon a program according to claim 3, wherein the processing of changing the parameter relating to the gravity comprises changing the parameter so that a value of the mass or the gravitational acceleration of the selected rigid body changes based on proximity between the selected object and a contact position between the first object and the second object.

5. The computer-readable non-transitory information storage medium having stored thereon a program according to claim 3, wherein the processing of changing the mass or the gravitational acceleration comprises selecting at least one of the plurality of the rigid bodies included in a range which is represented by a prolate spheroid wherein a center of the prolate spheroid is the contact position and which stretches in a predetermined direction.

6. The computer-readable non-transitory information storage medium having stored thereon a program according to claim 3, wherein the processing of changing the mass or the gravitational acceleration comprises selecting at least one rigid body so that an angle formed by a vector from a position of the selected rigid body to the contact position and a vector from a position of a rigid body connected to the selected rigid body to the position of the selected rigid body satisfies a predetermined condition.

7. The computer-readable non-transitory information storage medium having stored thereon a program according to claim 3 wherein the processing of physically calculating the motion of the rigid body comprises calculating a motion of the second object based on an angle between the mesh and the second object.

8. The computer-readable non-transitory information storage medium having stored thereon a program according to claim 2, wherein the processing of changing the parameter relating to the gravity comprises changing the parameter so that a value of the mass or the gravitational acceleration of the selected rigid body changes based on the angle between the rigid body and the second object.

9. The computer-readable non-transitory information storage medium having stored thereon a program according to claim 1, wherein the processing of changing the mass or the gravitational acceleration comprises changing a change amount of the parameter based on whether or not the value of the parameter increases from mass in a previous frame.

10. An image generating device, comprising:
gravity parameter changing means for changing a mass or a gravitational acceleration of each of a plurality of rigid bodies which are constrained to one another and included in a first object based on an angle between each of the plurality of rigid bodies and a second object;
physical calculation means for physically calculating a motion of each of the plurality of rigid bodies included in the first object based on the changed parameter; and
image rendering means for rendering an image representing a surface of the first object based on the motions of the plurality of rigid bodies included in the first object.

11. An image generating method, comprising:
changing a mass or a gravitational acceleration of each of a plurality of rigid bodies which are constrained to one another and included in a first object based on an angle between each of the plurality of rigid bodies and a second object;
physically calculating a motion of each of the plurality of rigid bodies included in the first object based on the changed parameter; and
rendering an image representing a surface of the first object based on the motions of the plurality of rigid bodies included in the first object.

\* \* \* \* \*